US010422722B2

United States Patent
Vogt et al.

(10) Patent No.: US 10,422,722 B2
(45) Date of Patent: Sep. 24, 2019

(54) ANTHROPOMORPHIC TEST DEVICE STORAGE CART

(71) Applicant: Toyota Motor Engineering & Manufacturing North America, Inc., Erlanger, KY (US)

(72) Inventors: Jared P. Vogt, Saline, MI (US); Scott M. Gordon, Trenton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 310 days.

(21) Appl. No.: 15/383,168

(22) Filed: Dec. 19, 2016

(65) Prior Publication Data

US 2018/0170416 A1    Jun. 21, 2018

(51) Int. Cl.
*G09B 23/30*   (2006.01)
*B62B 5/00*    (2006.01)
*G01M 17/007*  (2006.01)

(52) U.S. Cl.
CPC ......... *G01M 17/0078* (2013.01); *G09B 23/30* (2013.01); *B62B 5/00* (2013.01)

(58) Field of Classification Search
CPC .. B62B 3/04; B62B 3/06; G09B 23/32; G01L 5/0052; A47K 1/04
USPC .......................................... 248/129; 73/866.4
See application file for complete search history.

(56) References Cited

U.S. PATENT DOCUMENTS

| 5,520,494 | A  | * | 5/1996  | Hughes | B60P 3/1083 280/414.1 |
| 2003/0222186 | A1 | * | 12/2003 | Kim    | G01M 17/0078 248/129 |
| 2008/0173603 | A1 | * | 7/2008  | Dion   | A47B 47/028 211/182 |

FOREIGN PATENT DOCUMENTS

| CN | 201852691 U | 6/2011 |
| CN | 201859047 U | 6/2011 |
| CN | 202006819 U | 10/2011 |
| CN | 202836912 U | 3/2013 |
| CN | 203652488 U | 6/2014 |

OTHER PUBLICATIONS

"THOR-M Storage"; Humanetics Innovative Solutions; Jan. 2015, p. 1, Service Bulletin; www.humaneticsatd.com.

(Continued)

*Primary Examiner* — Eric S. McCall
*Assistant Examiner* — Timothy P Graves
(74) *Attorney, Agent, or Firm* — Dinsmore & Shohl LLP (57) ABSTRACT

A modular cart for use with an anthropomorphic test device, an assembly including an anthropomorphic test device and a method of placing an anthropomorphic test device on a modular cart. The cart includes a wheeled base with a pair of upstanding posts that together with members that can be interchangeably secured to one of the posts in order to form one of a storage position or a ready-to-test position. In this way, when an anthropomorphic test device is placed on the cart between these members, the members and the posts cooperate with one another to have the anthropomorphic test device be in a generally seating position that can accommodate both storage and testing without having to reposition the anthropomorphic test device.

19 Claims, 8 Drawing Sheets

(56) References Cited

OTHER PUBLICATIONS

Gall etal, "The Anthropomorphic Test Device (ATD) or Test Dummy", Mar. 2004, vol. 18, No. 3; mga research corporation, pp. 1-4.

* cited by examiner

ANTHROPOMORPHIC TEST DEVICE STORAGE CART

TECHNICAL FIELD

The present specification relates generally to a cart used to support anthropomorphic test devices (ATDs) that are employed for vehicular impact research, and more particularly with such a cart that has interchangeable features to promote ease of storage and usage of ATDs as a way to provide ergonomic benefits to personnel conducting such vehicular impact research.

BACKGROUND

It is known that vehicle manufacturers rely upon data gathered through an ATD that is used as a human surrogate in order to determine the crashworthiness of their vehicles. In one common form ATDs—which are more popularly known as crash test dummies—are outfitted with extensive amounts of sophisticated sensors and associated equipment in order to provide accurate biofidelic indicia that can help vehicle designers accurately model how the energy from a vehicle impact is absorbed by passengers within a vehicle, as well as design vehicles to eliminate or reduce bodily harm to such passengers in the event of an impact. One popular ATD is called a Test device for Human Occupant Restraint (THOR) that is manufactured by Humanetics Innovative Solutions of Plymouth, Mich. Because of their weight, cost and fragility, the THOR and related ATDs are stored during periods of non-use on conventional storage carts. Such carts employ a storage chair and a storage bracket that work in conjunction with one another to keep the ATD in a generally upright sitting position.

There are numerous disadvantages with conventional storage carts. For example, such carts generally only permit ATD storage in one position (typically sitting). This can in turn make it difficult for personnel that are responsible for ATD placement and storage to maneuver the ATD between storage and ready-for-test positions. In addition, the ATD extremities (in particular, the legs and feet) hang off the cart, which tends to create a tripping hazard, as well as the potential for such extremities to get caught on the floor during cart transport. Furthermore, the ATD clothing (which may be used to enhance the accuracy of a crash test by providing more realistic frictional contact between the ATD and a seatbelt, harness or related occupant restraint) can only be installed once the storage bracket is removed, making it very cumbersome to install such clothing while the ATD is positioned in the vehicle. Moreover, the cart is difficult to move and unsteady when it has the ATD installed. All of these create ergonomic concerns for the technician or other personnel conducting the crash test.

Other storage carts employ a chair-like structure with a generally horizontal seat portion, a generally vertical back portion secured to the seat portion and a leg portion to provide support to the seat and back portions. While such configurations provide a measure of support to the ATD, they do not use interchangeable components as a way to have the cart perform both ATD long-term storage and ATD ready-to-test functions, as the presence of the structure around significant portions of the ATD that is useful during a storage function precludes its use during a ready-to-test function\s.

SUMMARY

In one embodiment, a modular cart for use with an ATD is disclosed. The cart includes a wheeled base defining a substantially horizontal mounting platform, a first post coupled to and extending substantially vertically from the base to define a seating support, a second post coupled to and extending substantially vertically from the base to define a neck support, a first interchangeable member with a handle and a second interchangeable member with an anchor. The first and second interchangeable members are sized and shaped via suitable fitting to enable selective coupling to one or the other of the first and second posts. In this way, when the first interchangeable member is secured to one of the first and second posts, the second interchangeable member is secured to the other of the first and second posts and vice versa. The first and second interchangeable members are cooperative with one another and the posts such that when an ATD is placed between them on the cart, such placement forms either a storage position or a ready-to-test position, where the former comprises having the first interchangeable member secured to the second post and the second interchangeable member secured to the first post, and where the latter comprises having the first interchangeable member secured to the first post and the second interchangeable member secured to the second post.

In another embodiment, an ATD assembly is disclosed. The assembly includes an ATD, a mounting bracket that is selectively attached to the ATD and a modular cart for selective placement of the ATD thereon. The cart includes a wheeled base with a substantially horizontal mounting platform, a first post coupled to and extending substantially vertically from the base to define a seating support, a second post coupled to and extending substantially vertically from the base to define a neck support, and a first interchangeable member with a handle and a second interchangeable member with an anchor. The first and second interchangeable members are sized and shaped via suitable fitting to enable selective coupling to one or the other of the first and second posts. In this way, when the first interchangeable member is secured to one of the first and second posts, the second interchangeable member is secured to the other of the first and second posts and vice versa. The first and second interchangeable members are cooperative with one another and the posts such that placement of the ATD between them on the cart results in either a storage position or a ready-to-test position, where the former comprises having the first interchangeable member secured to the second post and the second interchangeable member secured to the first post, and where the latter comprises having the first interchangeable member secured to the first post and the second interchangeable member secured to the second post.

In yet another embodiment, a method of placing an ATD on a storage cart is disclosed. The method includes arranging a modular cart and securing the ATD on the cart in either a storage position or a ready-to-test position. The cart includes a wheeled base that has a substantially horizontal mounting platform, as well as a first and second post coupled to and extending substantially vertically from the base. The first post is used as a seating support, while the second post is used as a neck support and is horizontally spaced from the first post on the base. A pair of interchangeable members include one that has a handle, while the other acts as a mount for a storage bracket that is used as a coupling between the ATD and the interchangeable device's mount. Each of the first and second interchangeable members have a fitting that is sized or shaped to enable the coupling to one or the other of the posts.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments disclosed herein include placing adjustable features into the cart so that it can hold the ATD in both a long term storage position and a ready-to-test position. As can be seen, a handle formed on the first interchangeable member and an anchor formed on the second interchangeable member can be rearranged on support posts that are in turn mounted to the cart. This use of interchangeable components helps the cart keep the ATD's (a) thoracic spine aligned, (b) neck upright and thereby preventing offset, and (c) feet within the cart footprint when the cart and ATD are being used in the long-term storage position. Likewise, this use of interchangeable components helps the cart when being used in the ready-to-test position to improve ergonomics by (a) the simple use of a flexible connector (such as a nylon strap or the like) to secure the ATD to the interchangeable member with the anchor, (b) making it easier to install a garment (such as a jacket or the like) onto the ATD without having to do so while the ATD is already situated in the vehicle being crash tested, (c) making it easier to move the storage bracket during ATD placement (for example, vertically up-and-down adjustable) within a vehicle being crash tested, and (d) having the ATD take up less floor space in a storage room by keeping legs and feet within the footprint of the cart.

Figure 1A:
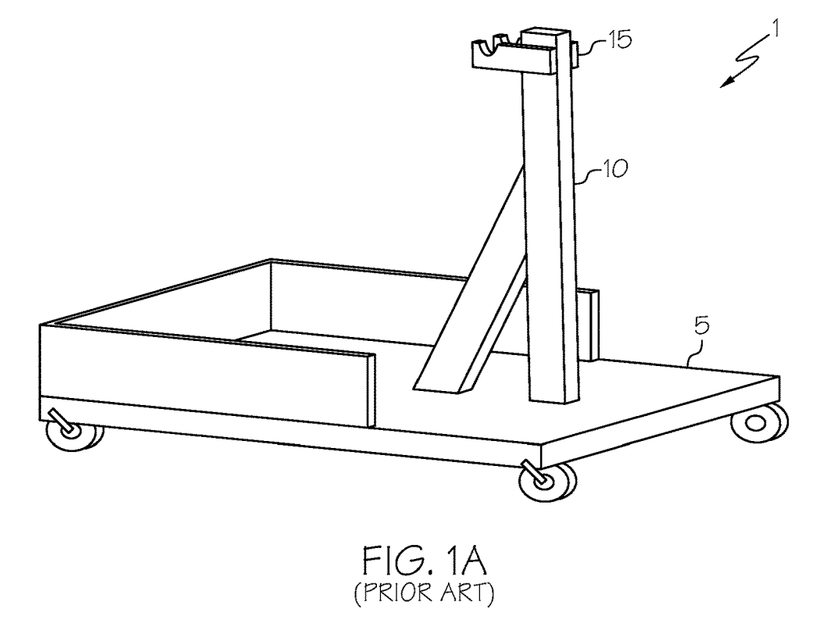
FIG. 1A depicts an empty ATD storage cart as practiced by the prior art.
Figure 1B:
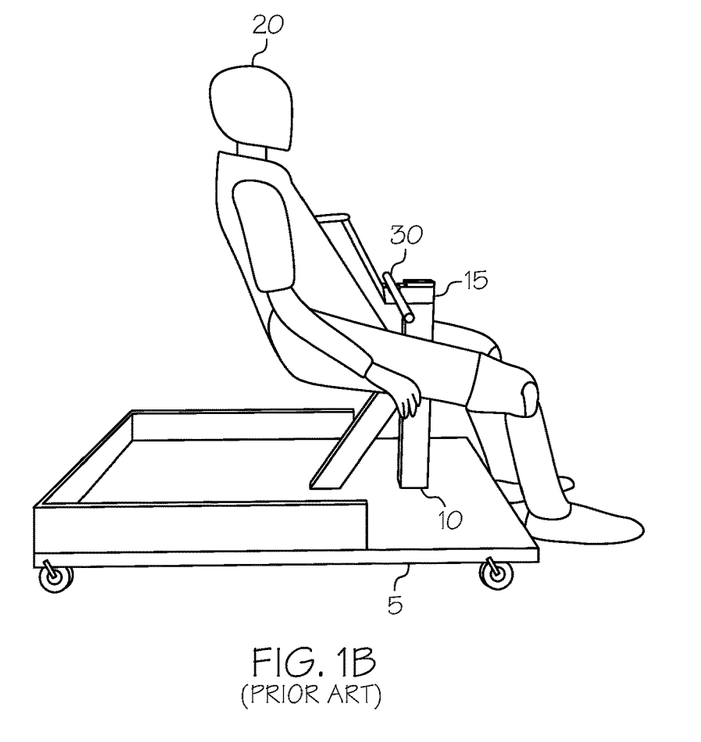
FIG. 1B depicts an ATD placed on the storage cart of FIG. 1A in a sitting position as practiced by the prior art.

Referring first to FIGS. 1A and 1B, an empty storage cart 1 (FIG. 1A) and an ATD 20 stored on the cart 1 (FIG. 1B) are shown. Cart 1 has a platform 5 and a support post 10, along with a rigidly affixed (i.e., immobile) storage bracket mount 15. When an ATD 20 is not in use for crash testing, it can be secured in a somewhat reclined sitting position to the cart 1 through the support post 10 and storage bracket mount 15, as well as a storage bracket 25. When placed against the support post 10, the weight of the ATD 20 (which is typically about the same as the human body whose crash-impact response it is designed to emulate) tends to force the ATD 20 into a relatively supine position until the pelvis contacts the support post 10. In this position, the feet of the ATD 20 tend to hang over the edge of the cart 1. The use of the storage bracket 25 along with the storage bracket mount 15 provide the vertical support, while the support post 10 is the only thing keeping the ATD 20 from sliding even farther forward.

Figure 2A:
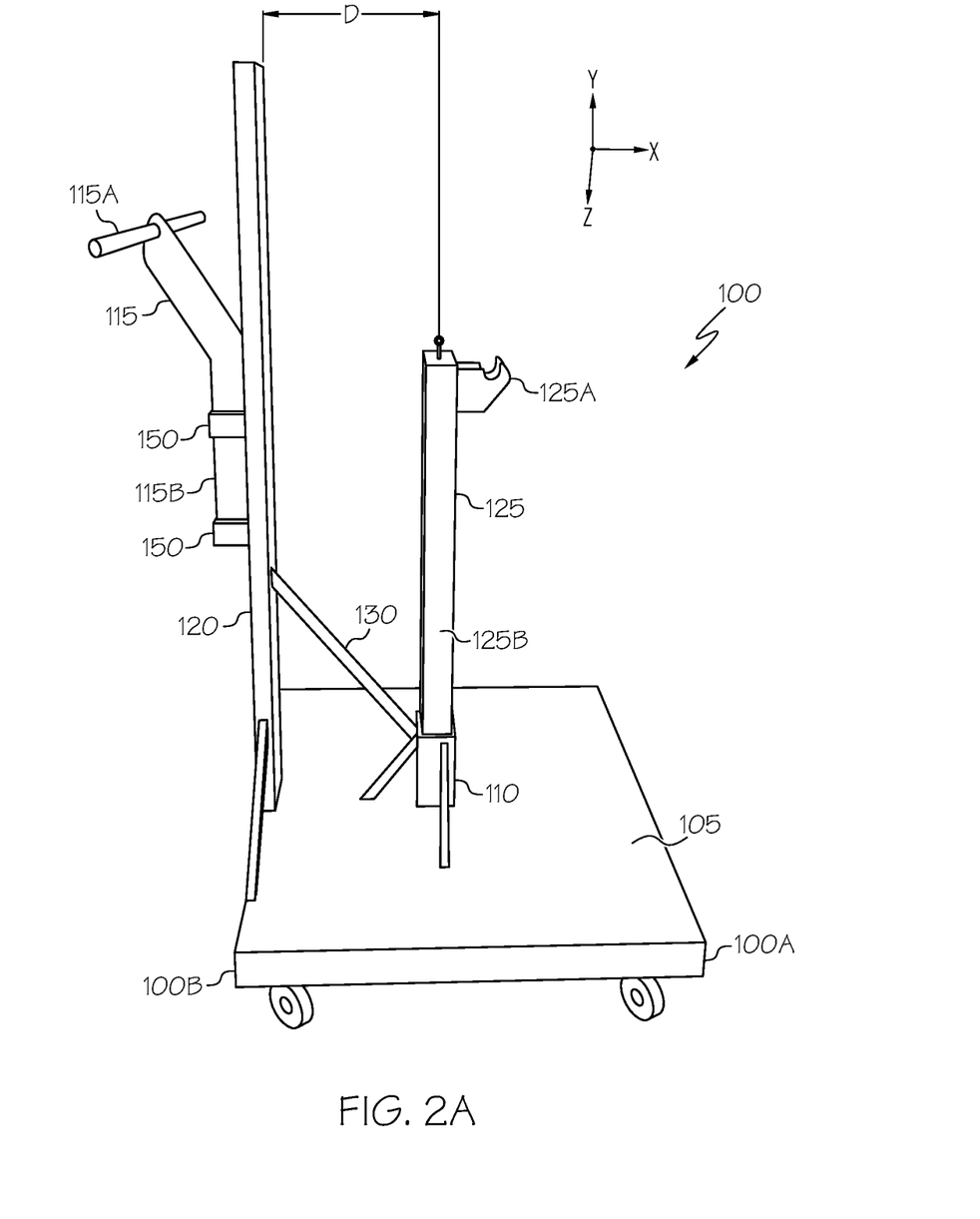
FIG. 2A depicts an empty ATD storage cart in a storage position in accordance with one or more embodiments shown or described herein.
Figure 2B:
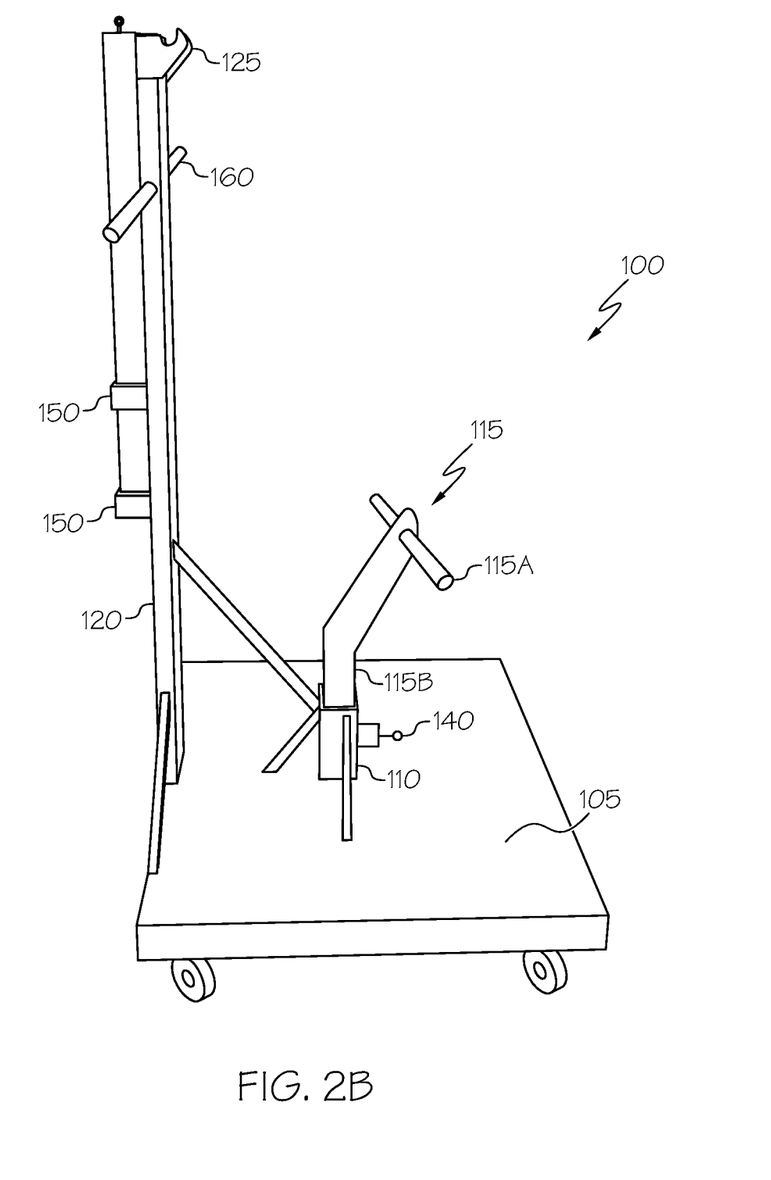
FIG. 2B depicts an empty ATD storage cart in a ready-to-test position in accordance with one or more embodiments shown or described herein.

Referring next to FIGS. 2A and 2B, a modular cart 100 in accordance with an embodiment is shown in both the storage position (FIG. 2A) and the ready-to-test position (FIG. 2B). Cart 100 includes a wheeled base 105 with a substantially horizontal mounting platform with a front edge 100A and a rear edge 100B. In one form, the length along the X-axis (as shown as part of the X-Y-Z Cartesian coordinates) from the front edge 100A and a rear edge 100B is roughly 42 inches, while the width along the Z-axis is about 28 inches. A pair of substantially vertical posts—including first post (also called an anchor post) 110 and second post (also called a transport post) 120—are secured to the base 105 and horizontally spaced apart by a distance D. In one form, the securing to the base 105 or to one another is through known means, such as screws, nuts and bolts, welding or related fastening approach. Likewise, in one form the spacing distance D is achieved by having the second post 120 be situated at or near the rear edge 100B while the first post 110 is situated closer to (but not at or near) the front edge 100A; however, placement of the posts 110, 120 at other locations on the base 105 are also deemed to be within the scope of the present disclosure. In one form, the posts 110 and 120 are made from a structurally rigid material, such as steel or the like. In addition, the first post 110 and second post 120 may be further secured to one another or to the base 105 through additional structure such as angled ties 130. Within the present context, the substantially vertical extension of the posts 110, 120 from the base 105 is meant to include slight variations such that even if the posts 110, 120 include a not-vertical component or orientation, they are still deemed to be vertical as long as the predominant effect of their placement or shape is to provide vertical-axis (i.e., Y-axis) support of an ATD 20. As will be discussed in more detail below, the first post 110 provides seating support to the ATD 20, while the second post 120 provides neck support to the ATD 20. In either case, it is beneficial for the cart 100 to minimize compression of the simulated spine (not shown) in order to preserve the integrity of the sensitive instrumentation, sensors and wiring contained within.

A pair of interchangeable members include a first interchangeable member 115 and a second interchangeable member 125, where their interchangeable nature can be better appreciated by comparing their relative positions in FIGS. 2A and 2B. In particular, FIG. 2A is associated with the ATD 20 storage position, where the first interchangeable member 115 is affixed along the side of the second (taller) post 120 while the second interchangeable member 125 is affixed on top of the first (shorter) post 120. Likewise, FIG. 2B is associated with the ATD 20 ready-to-test position, where the first interchangeable member 115 is affixed along the side of the first post 110 while the second interchangeable member 125 is affixed on top of the second post 120.

As shown, the first interchangeable member 115 terminates on its top with a handle 115A that extends in an angled direction relative to the generally vertical axis of the post 120, and on its bottom with a generally rectangular profile 115B along its vertical (i.e., Y-axis) dimension. Likewise, the second interchangeable member 125 terminates on its top with an anchor 125A, and on its bottom with a generally rectangular profile 125B along its vertical (i.e., Y-axis) dimension. It will be appreciated by those skilled in the art that the vertical dimension lengths of the posts 110, 120 and their joinable interchangeable members 115, 125 are shown as notional for a matter of convenience. As such, the precise line of demarcation between the posts 110, 120 and their respective interchangeable members 115, 125 is somewhat arbitrary. Accordingly, it will be appreciated by those skilled in the art that the corresponding vertical dimension length of the rectangular profile 115B, 125B bottom ends of the first and second interchangeable members 115, 125 is equally arbitrary, and that all such lengths of the posts 110, 120 and their corresponding interchangeable members 115, 125 are deemed to be within the scope of the present disclosure.

Both of first and second interchangeable members 115, 125 include one or more of sizing and shaping to enable selective coupling to one or the other of the first and second posts 110, 120. For example, the shape of the second post 120 and the first interchangeable member 115 is such that they define a sliding connection with one another, while one or more fasteners (such as a bolt or pin such as the lock pin 140 shown in first post 110) may be used to provide additional securing between the post and its connected interchangeable member. More particularly, each of the posts 110, 120 define a substantially hollow rectangular (i.e., tubular) construction in order to provide a slidable connection with which to receive the generally rectangular profiles 115B, 125B of the bottoms of the interchangeable members 115, 125. In particular, both posts 110, 120 have at least one female receiving portion as the substantially hollow rectangular construction. The dimensions of the receiving portion of each post 110, 120 are of substantially similar internal length and width dimensions of the other such that the male insertion portion of each of the interchangeable members 115, 125 can be switched to accommodate one or the other of the storage position of FIG. 2A and the ready-to-test position of FIG. 2B. The generally rectangular profiles 115B, 125B of the bottoms of first and second interchangeable members 115, 125 each has a substantially similar outer length and width dimension as the other such that a slidable male-female connection is formed between each of them and their respective posts 110, 120, thereby forming a close-tolerance fit that can withstand the loads imparted to them during ATD 20 storage and testing. In one form, such hollow construction may be in the form of an elongate (as in the case of the first post 110), while in another, it may be in the form of one or more banded collars 150 mounted to the exterior of the second post 120, such as by bolting, integral formation, welding or other conventional joining or forming techniques. Also as shown, the second post 120 may also be outfitted with a permanent handle 160 with which to push or pull the cart 100 by laboratory technicians or other personnel.

Figure 3A:
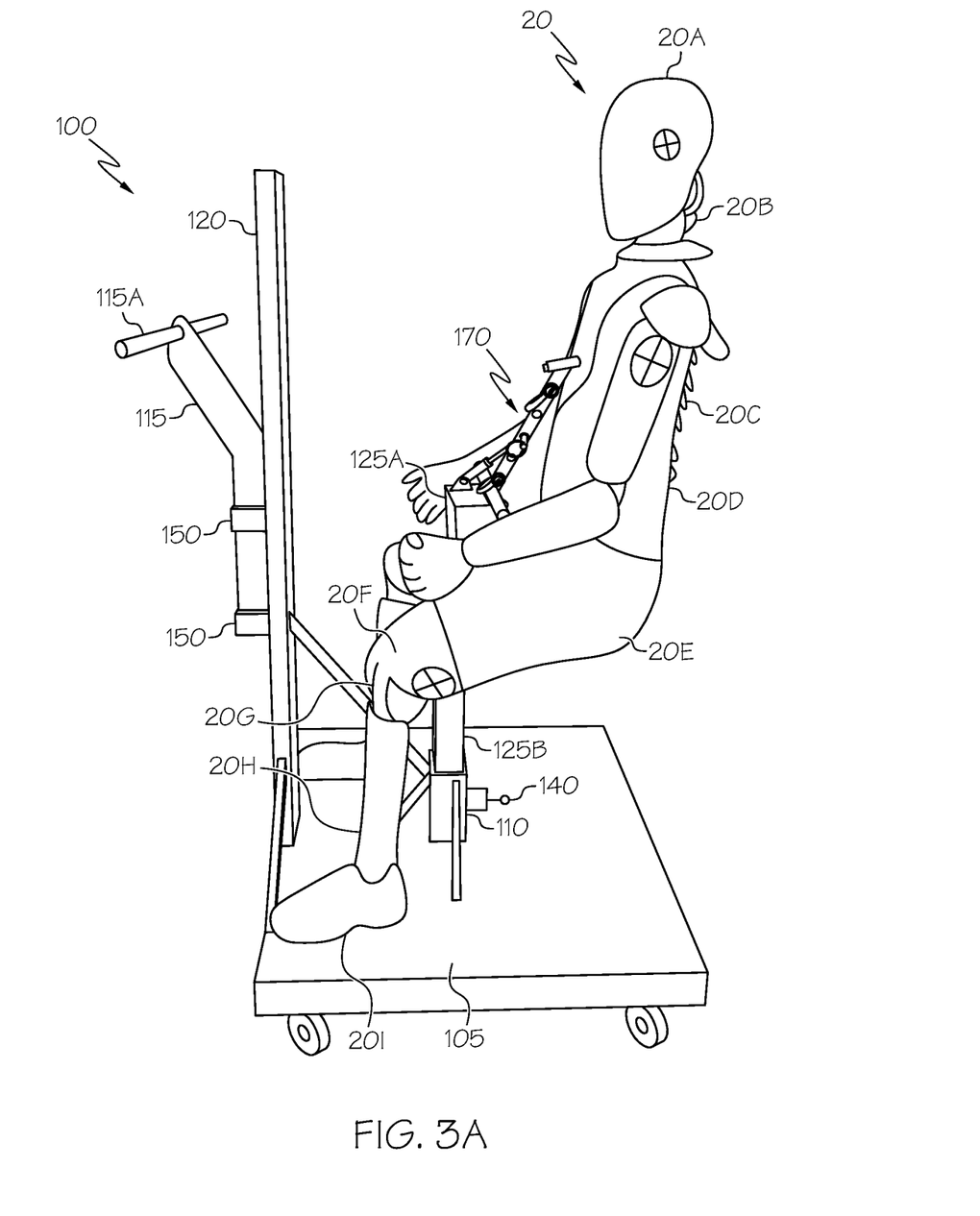
FIG. 3A depicts an ATD placed in a sitting position on the storage cart of FIG. 2A.
Figure 3B:
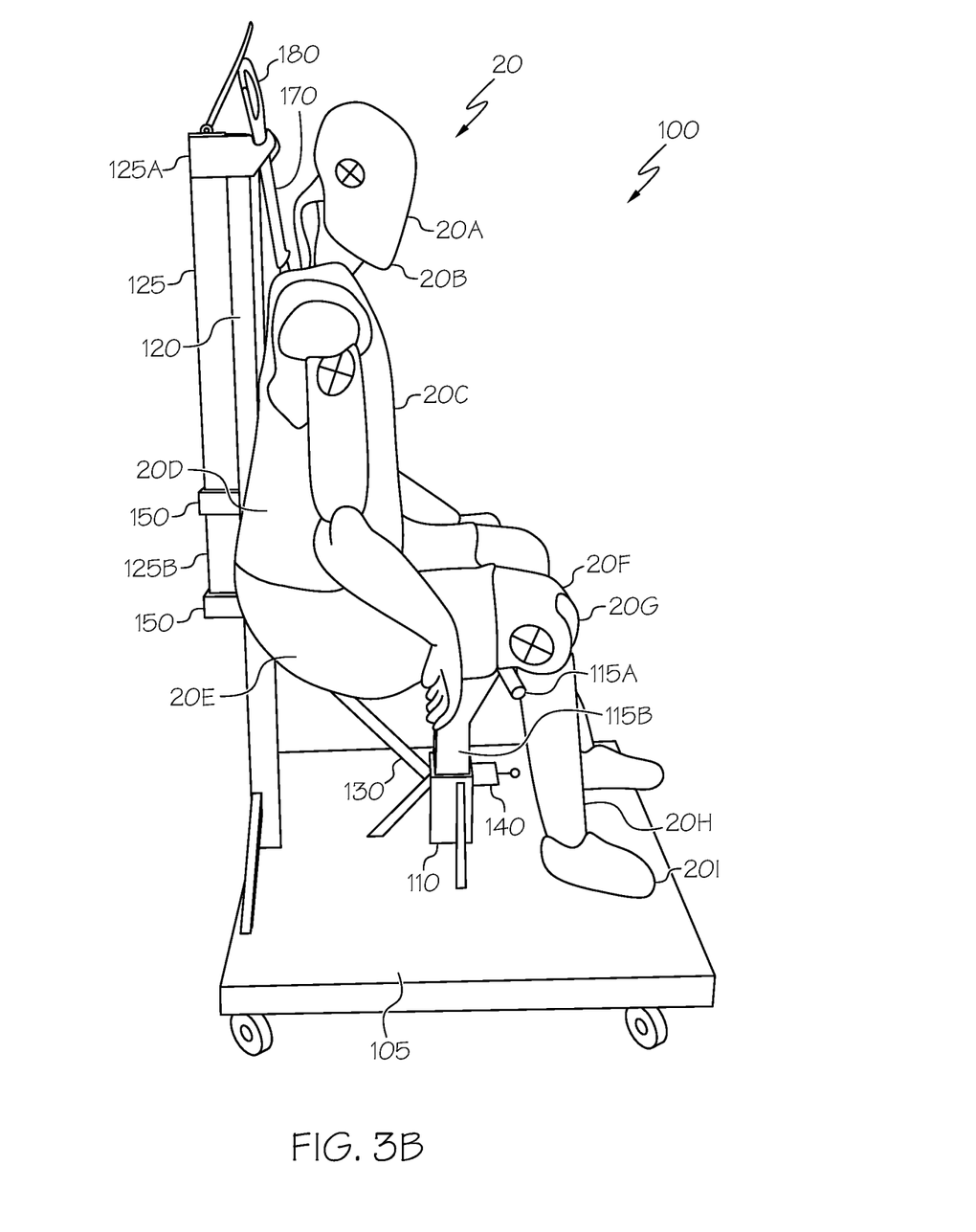
FIG. 3B depicts an ATD placed in a sitting position on the storage cart of FIG. 2B.

Referring next to FIGS. 3A and 3B, placement of an ATD 20 onto the cart 100 is shown for both the storage position (FIG. 3A) and the ready-to-test position (FIG. 3B). Moreover, ATD 20 is made from various materials, including plastic, foam, rubber, metal or the like in order to best simulate human flesh, bone, organs or the like. These materials, alone or in combination, may be used to replicate a head 20A, neck 20B (and related spine, not shown), torso 20C (which may be further broken down into upper thorax, lower thorax and abdomen), arms 20D, pelvis 20E, upper leg 20F, knee 20G, lower leg 20H and feet 20I, among others. In order to provide suitable data for use by government bodies such as the National Highway Traffic Safety Administration (NHTSA) and comparable private ones such as the Insurance Institute for Highway Safety (IIHS), the ATD 20 includes calibrated sensors and related instrumentation (not shown) that may include one or more load cells, accelerometers, potentiometers (such as string potentiometers), biometric-related sensors, cameras, microphones, infrared (IR) detectors or the like. By way of example, such instrumentation—which may be placed in or around the head 20A, neck 20B, torso 20C, arms 20D, upper legs 20F, knees 20G, lower legs 20H and feet 20I—may be used to gather displacement, force, velocity, acceleration and penetration data on an ATD 20 as a way to ensure that ATD 20 simulates actual human response to impacts and related forces generated during a crash. Some of the simulated regions of the body, such as the torso 20C, may define an integrated assembly which includes components from adjacent regions within the body, such as the shoulder, spine, ribcage, upper abdomen and related areas. As mentioned above, the ATD 20 may be configured in numerous different sizes and shapes in order to replicate as faithfully as possible comparable human bodies, especially as they relate to body measurements, weight and weight distribution.

Referring with particularity to FIG. 3A, the handle 115A is particularly useful during the storage position, as it is of sufficient rigidity to allow personnel in the crash test laboratory or related environment to push or pull the cart 100, even when loaded with an ATD 20 that can weigh anywhere from 50 to 300 pounds, depending on the size (i.e., child versus adult), gender (female versus male) and frame (i.e., thin, average or obese). Moreover, the lower portion of the second post 120 may define lateral extensions 120A that project along the rear edge 100B of cart 100. These extensions 120A can act as a stop to prevent feet 20I from extending beyond the footprint defined by the cart 100. In addition, these lateral extensions 120A may include mounting locations for placement of the mounting bracket 180 or other components that are not being used when the cart 100 is in one or the other of its storage or ready-to-test configurations. Likewise, the handle 115A is particularly useful during the storage position, as it is of sufficient rigidity to allow personnel in the crash test laboratory or related environment to push or pull the cart 100. Regarding the second interchangeable member 125 and cart 100, given that an average adult male ATD 20 is approximately 4 feet tall in a sitting position, the placement of the second interchangeable member 125 is placed—in one form—about 30 inches above the platform of base 105. Such height will help ensure that when the ATD 20 is in a seated position, the feet 20I can be placed on the cart 100.

Figure 4:
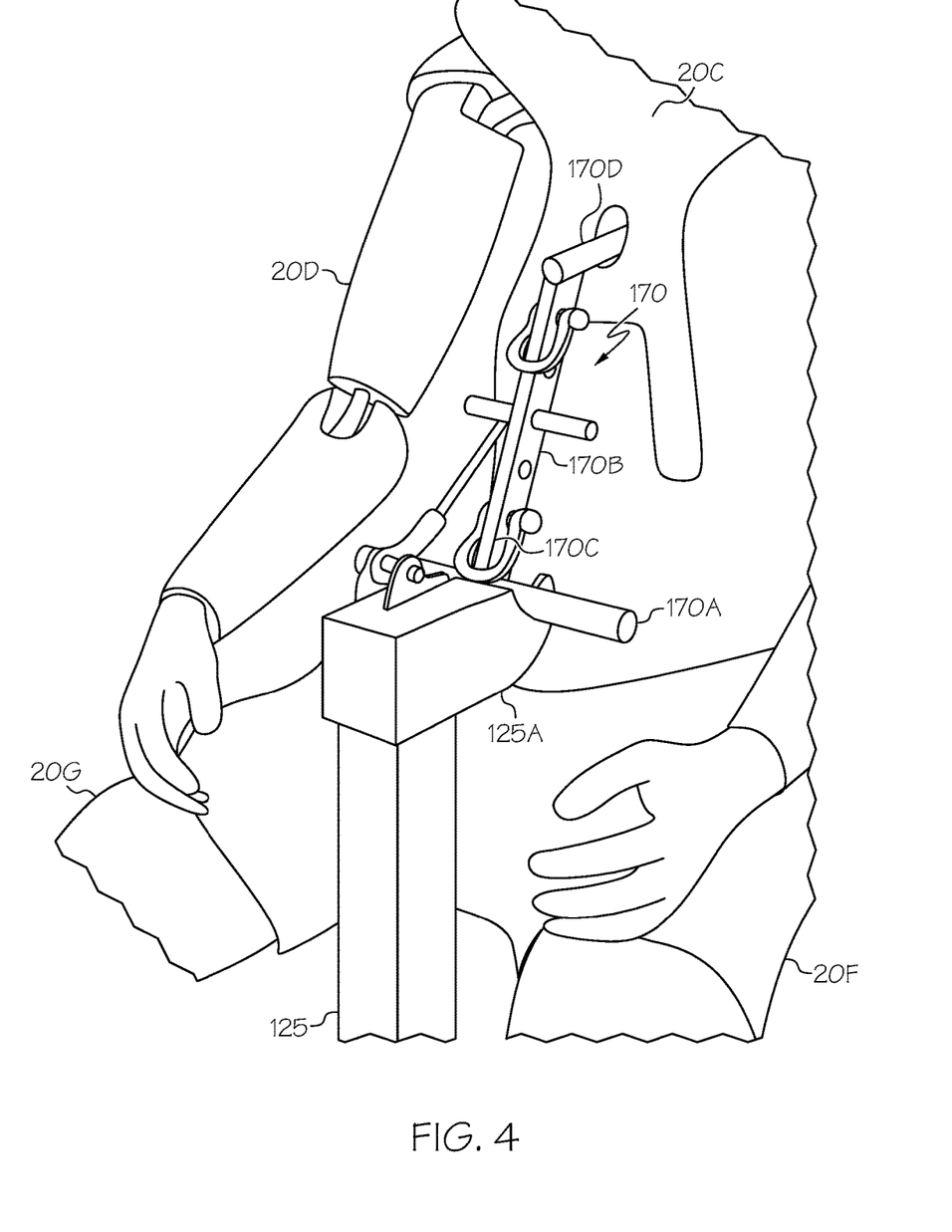
FIG. 4 shows a detail view of the connection between the torso region of the ATD and the cart while the ATD is in the storage position.
Figure 5:
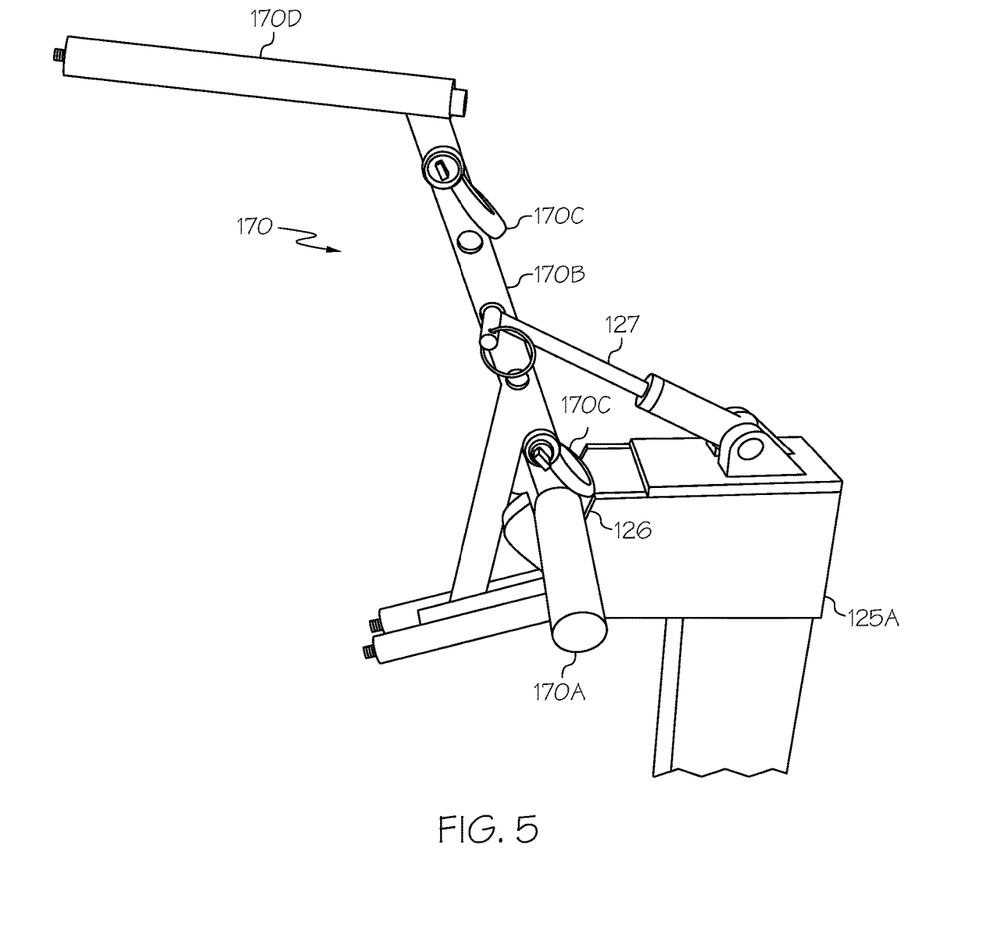
FIG. 5 depicts details associated with the connection of the anchor of one of the interchangeable members to a storage bracket for use while the ATD is in the storage position.

Referring next to FIGS. 4 and 5, details associated with placement of ATD 20 in the storage position of FIG. 3A are shown. In the storage position, the upper legs 20F of the ATD 20 straddle the first post 110 but do not come in contact with it to avoid undue contact of the ATD 20 instrumentation, sensors or wiring. As can be seen, U-shaped recess 126 of the second interchangeable member 125 is sized and shaped to accept the placement of the handle-like lateral extension 170A that forms a T-shaped connection with a main truss 170B of the mounting bracket 170. One or more additional clevis-like structures 170C are used for selective attachment, while an aperture formed in the torso 20C permits the mounting of a threaded pin 170D that makes up an end of the mounting bracket 170 that is opposite of the handle-like lateral extension 170A. As can be seen, the pin 170D is used to secure the ATD 20 at one end, while the opposing end shown by the handle-like lateral extension 170A is secured to the second interchangeable member 125 that is in turn secure to the base 105 through its male-female connection to first post 110. The rigid connection of the ATD 20 to the cart 100 through the use of the second interchangeable member 125 as an intermediary helps avoid the situation associated with conventional cart 1 that relies on the interaction between the pelvis 20E and the post 10 as a way to keep the ATD 20 propped up in a sitting position. As can be seen, the second interchangeable member 125 further includes a T-shaped pivoting mount 127 that can be used along a linear array of apertures formed along the length of the main truss 170B of the mounting bracket 170 so as to accommodate differing sizes of ATD 20 in its joining to the second interchangeable member 125. Referring with particularity to FIG. 5, the cooperation of the recess 126 that is formed in the anchor 125A that itself formed at the top of the second interchangeable member 125 and the handle-like lateral extension 170A of the mounting bracket 170 acts to secure an ATD 20 that is connected to the pin 170D. This cooperation can—in addition to providing resistance against the horizontal (i.e., X-axis) movement of an ATD 20—provide visible indicia that the placement of the ATD 20 on the cart 100 is substantially correct. Additional securing for ATD 20 in the storage position is promoted through the cooperation of the T-shaped pivoting mount 127 and the main truss 170B.

Figure 6:
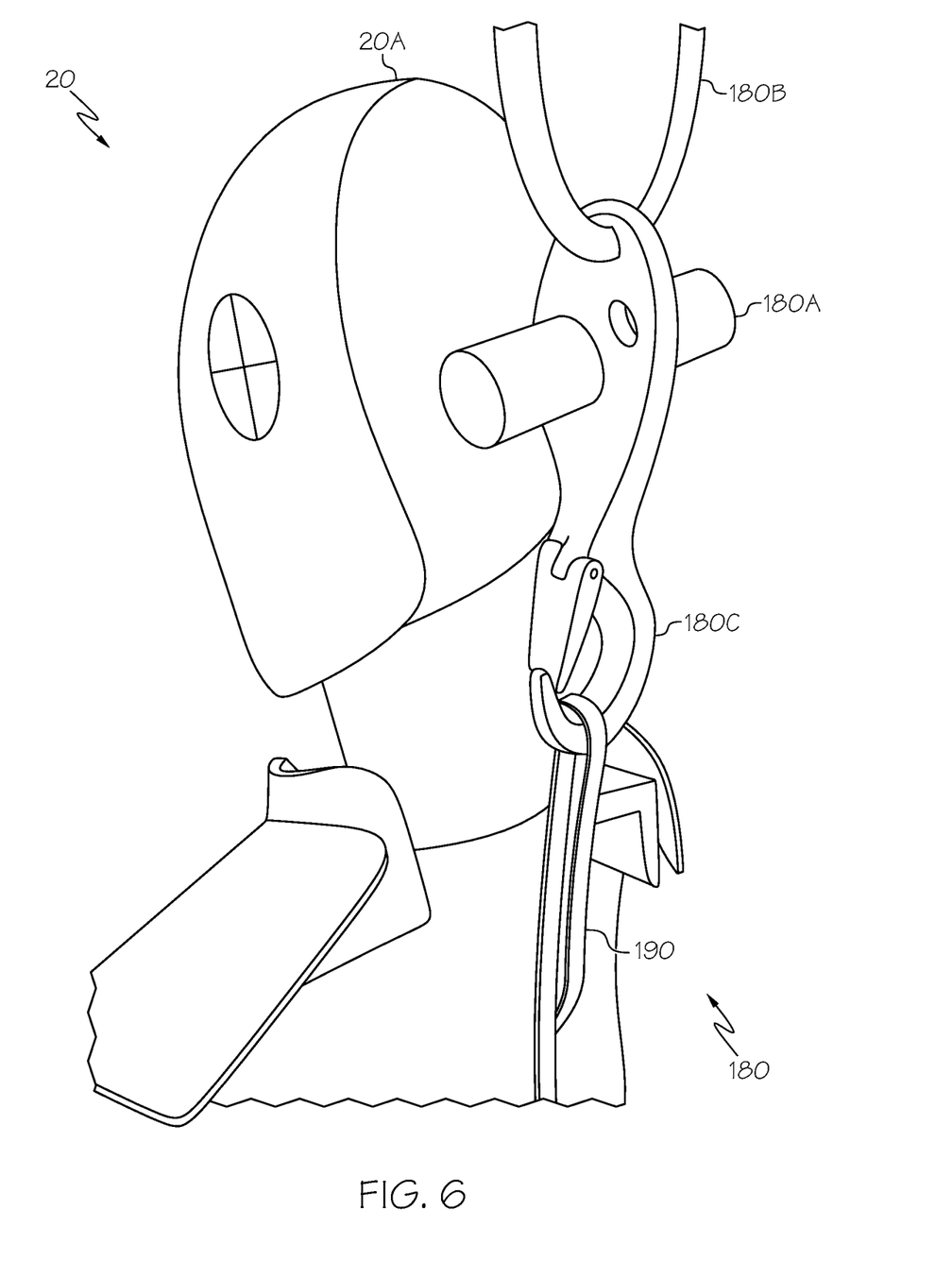
FIG. 6 depicts a detail view of the connection between the neck region of the ATD and the cart while the ATD is in the ready-to-test position.

Referring next to FIG. 6 in conjunction with FIG. 3B, details associated with placement of ATD 20 in the ready-to-test position are shown. In particular, the first interchangeable member 115 is now relocated to the first post 110 so that the post 110 and handle 115A can cooperate to form a seat for ATD 20. Although dissimilar in appearance to a traditional seat that has a generally horizontal plate-like shape, the combination of the post 110 and handle 115A act on the hinged joint behind knees 20G to act as a movement constraint. Furthermore, the second interchangeable member 125 is connected to the side of the second post 120 through the banded collars 150. In this way, a flexible connector 180 can be placed at the top of the second post 120. This flexible connector 180 can extend in an upward direction at one end and in a downward direction at the other end. In one form, the middle of the flexible connector 180 may be formed as a handle-like lateral extension 180A with a pivoting ring 180B at the top for grasping by a hoist (not shown) in the event the entire assembly of the ATD 20 and the cart 100 needs to be lifted, and a pivoting hook or carabiner 180C at the bottom for grasping the strap 190 that may be coupled to the rear of torso 20C. The handle-like lateral extension 180A acts as a mount within recess 126 in a manner generally similar to the handle-like lateral extension 170A of the mounting bracket 170 in that it provides a secure connection in order to keep the ATD 20 in a seating position when the assembly of it and the cart 100 are in the ready-to-test position.

As mentioned above, one benefit is that when the ATD 20 is placed in the ready-to-test position of FIG. 6, the storage bracket 170 is removed from the torso 20C of the ATD 20 and placed on the taller vertical post 120; by not having the storage bracket 170 protrude through the torso 20C, the jacket and related testing garments can easily be placed on the ATD 20. Such simplicity of setup between the two positions saves time and frustration for crash test technicians and related personnel.

Although it is often advisable to store an ATD 20 in as much of a supine position as possible in order to remove as much load from the neck 20B and torso 20C region as possible, the authors of the present disclosure have determined that such a position is not feasible for a crash test facility that may have large numbers of ATDs 20, as storage space may be at a premium. Although such storage could be equally achieved by vertical (i.e., standing) storage, it is preferable to avoid such an approach, as there are additional difficulties associated with such placement. In particular, vertically hanging the ATD 20 from its head 20A or neck 20B regions is undesirable, as they are typically not designed to support the full ATD 20 weight in tension. Furthermore, storing the ATD 20 in a supine position creates an extra ergonomic hardship on test personnel, as the substantial weight associated with the simulated body construction of the ATD 20 may lead to rapid fatigue associated with personnel bending over and the repeated repositioning of the ATD 20 from a storage position to a ready-to-test position.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. For example, the system and methods using the system may be implemented in one or both of software and hardware, and that all variations on the embodiments of such system and method as discussed herein will be understood to be within the scope of the present disclosure. Furthermore, the order of steps associated with such methods may be changed, while various features of the system may be combined, added, removed, reordered, modified or the like, and still be within the scope of the present disclosure. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A modular cart for use with an anthropomorphic test device, the cart comprising:
   a wheeled base defining a substantially horizontal mounting platform;
   a first post coupled to and extending substantially vertically from the base to define a seating support;
   a second post coupled to and extending substantially vertically from the base to define a neck support, the second post being horizontally spaced from the first post on the base;
   a first interchangeable member defining a handle thereon; and
   a second interchangeable member defining an anchor, the first and second interchangeable members each comprising a fitting to enable selective coupling to one or the other of the first and second posts such that when the first interchangeable member is secured to one of the first and second posts, the second interchangeable member is secured to the other of the first and second posts, the first and second interchangeable members cooperative with one another and the posts such that placement therebetween of an anthropomorphic test device on the cart defines either a storage position or a ready-to-test position, wherein the storage position comprises having the first interchangeable member secured to the second post and the second interchangeable member secured to the first post, and further wherein the ready-to-test position comprises having the first interchangeable member secured to the first post and the second interchangeable member secured to the second post;

wherein a storage bracket couples an anthropomorphic test device to the second interchangeable member in the storage position.

2. The cart of claim 1, wherein when placed in the storage position, the second interchangeable member is coupled to the anthropomorphic test device through the storage bracket that has an attachment to an anthropomorphic test device torso at one substantial end and an attachment to the second interchangeable member at the other substantial end.

3. The cart of claim 1, wherein when placed in the ready-to-test position, the second interchangeable member is coupled to an anthropomorphic test device through a flexible connector that has an attachment to an anthropomorphic test device neck at one substantial end and an attachment to the second interchangeable member at the other substantial end.

4. The cart of claim 1, wherein when placed in the ready-to-test position, the first interchangeable member is coupled to an anthropomorphic test device pair of legs through the handle such that the handle forms a resting support thereby.

5. The cart of claim 1, wherein when placed in the ready-to-test position, the second interchangeable member is coupled to an anthropomorphic test device through a flexible connector that has an attachment to an anthropomorphic test device neck at one substantial end and an attachment to the second interchangeable member at the other substantial end, and further wherein the first interchangeable member is coupled to an anthropomorphic test device pair of legs through the handle such that the handle forms a resting support thereby.

6. The cart of claim 5, wherein the flexible connector comprises at least one ring and at least one mount.

7. The cart of claim 1, wherein the second post is attached to the first post by a rigid structural connection therebetween, as well as through their respective attachment to the base.

8. The cart of claim 1, wherein each of the posts define a substantially hollow rectangular construction, and further wherein each of the first and second interchangeable members define a substantially rectangular construction such that a slidable connection is formed between such outer length and width dimensions of the first and second interchangeable members and the inner length and width dimensions of the first and second posts.

9. The cart of claim 8, wherein the substantially hollow rectangular construction of the second post comprises at least one banded collar mounted to the exterior of the second post.

10. An anthropomorphic test device assembly comprising:
an anthropomorphic test device;
a storage bracket that is selectively attached to the anthropomorphic test device; and
a modular cart for selective placement of the anthropomorphic test device thereon, the cart comprising:
a wheeled base defining a substantially horizontal mounting platform;
a first post coupled to and extending substantially vertically from the base to define a seating support;
a second post coupled to and extending substantially vertically from the base to define a neck support, the second post being horizontally spaced from the first post on the base;
a first interchangeable member defining a handle thereon; and
a second interchangeable member defining an anchor, the first and second interchangeable members each comprising a fitting to enable selective coupling to one or the other of the first and second posts such that when the first interchangeable member is secured to one of the first and second posts, the second interchangeable member is secured to the other of the first and second posts, the first and second interchangeable members cooperative with one another and the posts such that placement therebetween of the anthropomorphic test device on the cart defines either a storage position or a ready-to-test position, wherein the storage position comprises having the first interchangeable member secured to the second post and the second interchangeable member secured to the first post, and further wherein the ready-to-test position comprises having the first interchangeable member secured to the first post and the second interchangeable member secured to the second post;
wherein the storage bracket couples the anthropomorphic test device to the second interchangeable member in the storage position.

11. The assembly of claim 10, wherein when placed in the storage position, the second interchangeable member is coupled to the anthropomorphic test device through the storage bracket that is attached to the anthropomorphic test device torso at one substantial end and to the second interchangeable member at the other substantial end.

12. The assembly of claim 10, wherein when placed in the ready-to-test position, the second interchangeable member is coupled to the anthropomorphic test device through a flexible connector.

13. The assembly of claim 10, wherein each of the posts define a substantially hollow rectangular construction of similar internal length and width dimensions, and further wherein each of the first and second interchangeable members define a substantially rectangular construction of similar outer length and width dimensions such that a slidable connection is formed between such outer length and width dimensions of the first and second interchangeable members and the inner length and width dimensions of the first and second posts.

14. The assembly of claim 10, wherein the second interchangeable member further comprises a pivoting mount formed adjacent a recess both of which are defined in a top of the second interchangeable member.

15. A method of placing an anthropomorphic test device on a modular cart, the method comprising:
arranging a modular cart to comprise:
a wheeled base defining a substantially horizontal mounting platform;
a first post coupled to and extending substantially vertically from the base to define a seating support;

a second post coupled to and extending substantially vertically from the base to define a neck support, the second post being horizontally spaced from the first post on the base;

a first interchangeable member defining a handle thereon; and a second interchangeable member defining an anchor, the first and second interchangeable members each comprising a fitting to enable selective coupling to one or the other of the first and second posts; and securing the anthropomorphic test device on the cart in either a storage position or a ready-to-test position;

wherein the arranging comprises securing the first interchangeable member to the second post and securing the second interchangeable member to the first post, and further securing the anthropomorphic test device on the cart in the storage position.

16. The method of claim 15, wherein securing the anthropomorphic test device on the cart in the storage position further comprises attaching the anthropomorphic test device to the second interchangeable member through a storage bracket that extends between a torso of the anthropomorphic test device at one substantial end and to the second interchangeable member at the other substantial end.

17. The method of claim 15, wherein the arranging comprises securing the first interchangeable member to the first post and securing the second interchangeable member to the second post, and further securing the anthropomorphic test device on the cart in the ready-to-test position.

18. The method of claim 16, wherein securing the anthropomorphic test device on the cart in the ready-to-test position further comprises attaching the anthropomorphic test device to the second interchangeable member through a flexible connector.

19. The method of claim 15, wherein the securing the anthropomorphic test device on the cart in either a storage position or a ready-to-test position comprises placing and maintaining the anthropomorphic test device in a substantially sitting position.

* * * * *